No. 622,949. Patented Apr. 11, 1899.
T. W. GREEN.
ROTARY BLOWER.
(Application filed Jan. 9, 1899.)
(No Model.) 3 Sheets—Sheet 1.

WITNESSES: INVENTOR
Thomas W. Green
BY
ATTORNEY.

THE NORRIS PETERS CO., PHOTO-LITHO., WASHINGTON, D. C.

United States Patent Office.

THOMAS W. GREEN, OF PHILADELPHIA, PENNSYLVANIA, ASSIGNOR TO THE WILBRAHAM BAKER BLOWER COMPANY, OF SAME PLACE.

ROTARY BLOWER.

SPECIFICATION forming part of Letters Patent No. 622,949, dated April 11, 1899.

Application filed January 9, 1899. Serial No. 701,593. (No model.)

*To all whom it may concern:*

Be it known that I, THOMAS W. GREEN, a citizen of the United States, residing at Philadelphia, in the county of Philadelphia and State of Pennsylvania, have invented certain new and useful Improvements in Rotary Blowers, of which the following is a specification, reference being had therein to the accompanying drawings.

My invention relates to rotary pressure blowers or exhausters; and the object of my improvement is to construct a blower that will have a maximum capacity with a minimum expenditure of power and at the same time discharge the fluid acted upon in a steady and regular stream free from any pulsation. To accomplish the desired result, I construct the blower with a single impeller that is open at both ends and has therein intake and discharge ports separated by an intervening web portion, one end of said impeller communicating with the intake and the opposite end of the impeller communicating with the discharge-opening in the blower.

Figure 1:
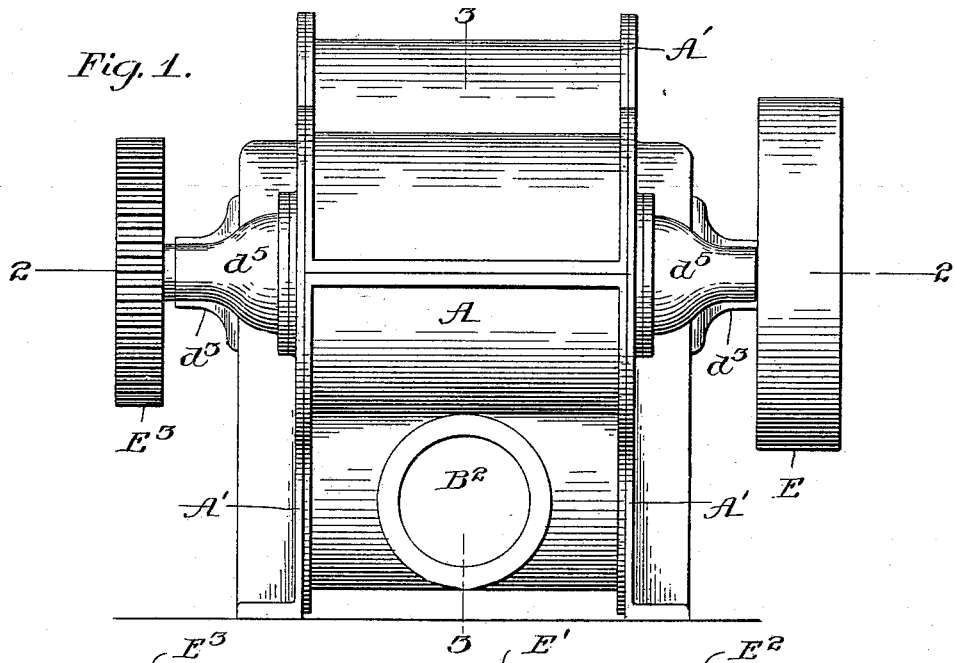
Figure 2:
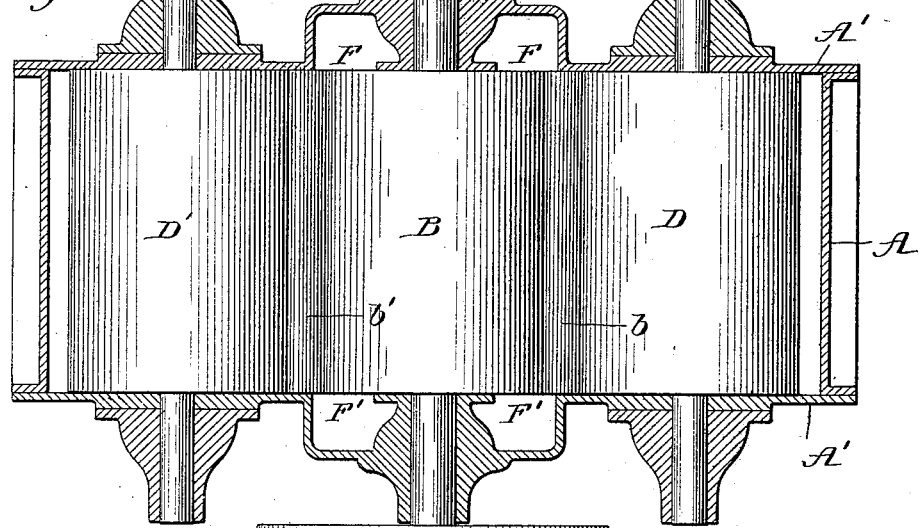
Figure 3:
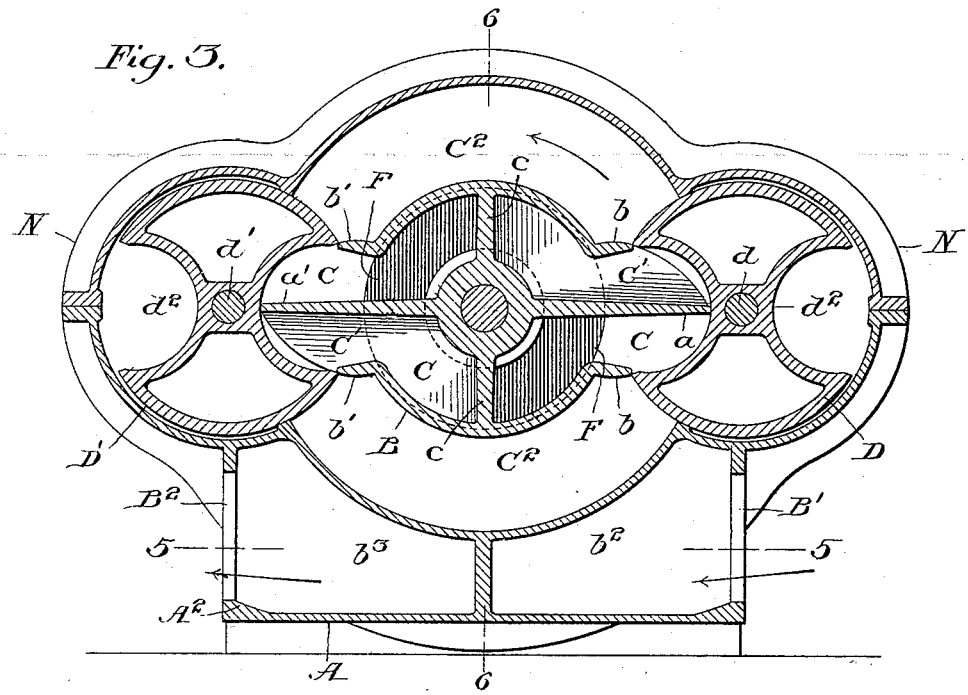
Figure 4:
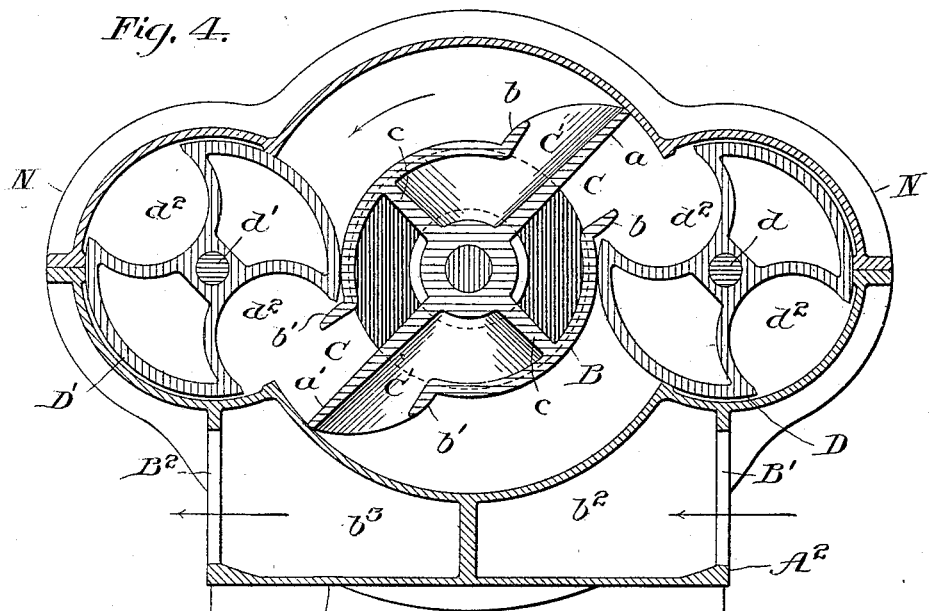
Figure 5:
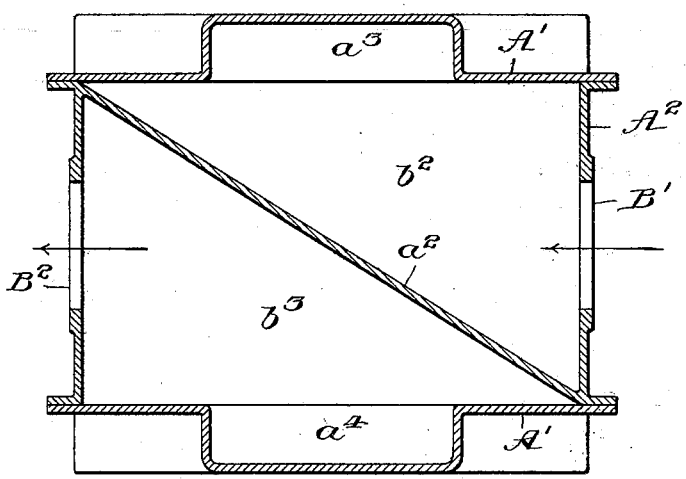
Figure 6:
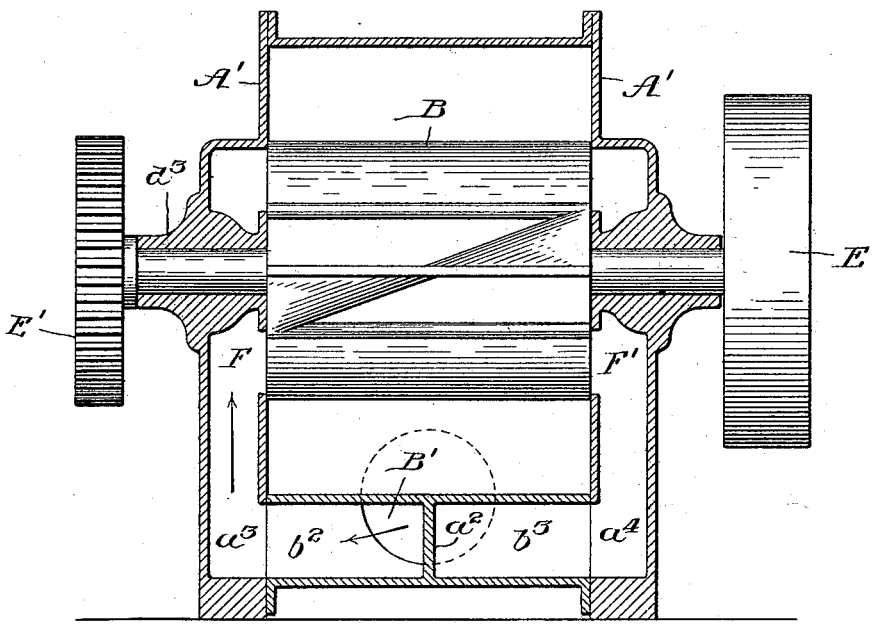

In the accompanying drawings, Figure 1 is an end elevation of my improved blower. Fig. 2 is a horizontal sectional view of the blower on line 2 2 of Fig. 1. Fig. 3 is a vertical sectional view on line 3 3 of Fig. 1. Fig. 4 is a vertical sectional view on line 3 3 of Fig. 1, but with the impeller turned about one-eighth of a revolution farther around in the direction indicated by the arrows. Fig. 5 is a horizontal section on line 5 5 of Fig. 3. Fig. 6 is a vertical section on line 6 6 of Fig. 3.

A represents the outer casing surrounding the working parts of the blower.

A' A' are the two end plates inclosing the ends of the blower and forming supports for the driving-shafts.

B is the impeller, located in the middle or central part of the blower and provided with two extending wings or blades $a\, a'$. The forward ends of these extending wings or blades conform to the curve of the inside of the outer casing A and sweep the air therefrom into and through the discharge-ports.

C C are two spiral intake ports or ways extending inwardly from the intake end of the impeller and opening into the space inclosed by the outer casing A.

C' C' are two spiral discharge-ports in the impeller similar to the intake-ports, but opening outwardly and extending from the inside of the impeller to the end opposite from the intake.

$c\, c$ are two spirally-formed webs connecting the central part of the impeller with the outer circular part and separating the intake and discharge ports.

$b\, b$ and $b'\, b'$ are four extensions formed on the impeller in the position shown in Figs. 3 and 4. The outer surfaces of the extensions $b$ and $b'$ are made to conform to the curves described by the corners or angles of the semicircular depressions in the revolving cut-off valves, and thus form a lock or cut-off until such times as the outer circular surfaces of the revolving cut-offs and the circular surfaces on the impeller meet.

$b_2$ is the driving-shaft of the impeller.

D D' are two revolving valves or cut-offs extending from end to end of the blower on opposite sides of the impeller B and parallel therewith.

$d\, d'$ are the driving-shafts of the revolving cut-off valves D D'.

$d^2\, d^2$ are semicircular depressions formed in the revolving cut-off valves and are made to conform to the sweep of the impeller-wings $a\, a'$.

E is the driving-pulley on the shaft of the impeller.

E' E² E³ are gear-wheels on the ends of the driving-shafts of the impeller and revolving cut-offs, respectively.

F F' are two circular depressions or chambers formed in the two end plates A' A' around the driving-shaft $b_2$ and communicating with the open ends of the impeller.

$d^3\, d^4\, d^5$ are journal-boxes for the driving-shafts.

A² is the base portion of the blower underneath and outside of the casing A.

$a^2$ is a partition extending diagonally across the base portion A² and dividing it into the two triangular apartments $b^2$ and $b^3$, particularly shown in Fig. 5.

$a^3\, a^4$ are rectangular channels or ways in the end plates A', extending from the circular depressions F F' to and communicating with the triangular compartments $b^2$ and $b^3$.

B' is the intake communicating with the compartment $b^2$, and B² is the discharge-opening communicating with the compartment $b^3$.

The several parts of the blower being constructed and arranged as shown and a driving-belt secured upon the driving-pulley E, the operation of the machine is as follows: The movement of the driving-pulley E operates the impeller and gear-wheels E', E², and E³, the impeller moving in the direction indicated by the arrows in Figs. 3 and 4. This movement of the impeller will cause the air to flow in through the intake B' into the chamber $b^2$ and the passage-way $a^3$, filling the circular depression or chamber F, from whence it passes through the intake-ports C into the space C² inside of the casing of the blower. From there it passes or is forced outwardly through the spiral discharge-ports C' of the impeller into the circular depression or chamber F', out through the passage or channel $a^4$ into the triangular chamber $b^3$, and out at the discharge-opening B². The intake-openings in the one end of the impeller being at all times in communication with the chamber F and the intake channels or ways that lead to the open air and the discharge-opening at the opposite end of the impeller being at all times in communication with the chamber F, and the discharge-orifice, a continuous stream of air is pumped into and discharged out of the blower free from any pulsation or variation. The revolving cut-off valves D D' prevent the air from being forced backwardly or churned around with the wings of the impeller.

Instead of making the intake-ports C and the discharge-ports C' spiral in form they may be straight, if desired. The depressions or chambers F F' in the end plates A' A' may be of any convenient shape and need not extend all of the way around the shaft of the impeller, but they must be large enough to permit the incoming and outgoing air to pass freely through them.

Having thus described my invention, what I claim as new, and desire to secure by Letters Patent of the United States, is—

1. A rotary blower having the impeller thereof provided with an intake and a discharge port, said intake and discharge ports opening into opposite ends of the impeller and separated from each other by an intervening web portion, the intake-port registering with a chamber that communicates with the intake-opening and the discharge-port registering with a chamber communicating with the discharge-opening, substantially as and for the purpose set forth.

2. A rotary blower having the impeller thereof provided with intake and discharge ports that communicate with each other through the space inclosed by the casing surrounding the blower and separated from each other by an intervening web portion; the intake-port opening into one end of the impeller and registering with an inlet on the end of the blower and the discharge-port on the opposite end of the impeller registering with a discharge-opening, substantially as shown and for the purpose described.

3. A rotary blower having therein a single impeller open at both ends and provided with two ports or channels extending inwardly in opposite directions from the ends, being separated from each other by an intervening web portion; one of said ports registering with a chamber connected with the intake and the other of said ports opening into a chamber communicating with the discharge-opening, substantially as shown and for the purpose described.

4. In a rotary blower, the impeller B, having therein inlet and discharge ports extending from the inner part of the impeller to opposite ends thereof and separated by an intervening web portion and the inlet-opening F, communicating with the intake and the outlet-opening F', communicating with the discharge, in combination with the revolving cut-offs D, and D', located on opposite sides of the impeller and parallel therewith, substantially as shown and for the purpose described.

5. In a rotary blower the impeller B, having therein an inlet and a discharge port extending from the inner part of the impeller in opposite directions to the ends of said impeller and separated by an intervening web portion, in combination with the inlet-chamber F, passage-way $a^3$, chamber $b^2$, intake-opening B', the chamber F', passage-way $a^4$, chamber $b^3$, discharge-opening B², and the revolving cut-off valves D, and D', all arranged, substantially as shown and for the purpose described.

In testimony whereof I affix my signature in presence of two witnesses.

THOMAS W. GREEN.

Witnesses:
THOS. D. MOWLDS,
SAML. H. KIRKPATRICK.